April 25, 1933.                S. SKOKO                 1,905,007
        COMBINATION AUTOMOBILE LICENSE CARRIER, BUMPER, AND RELEASE
                    Filed Dec. 7, 1932     2 Sheets-Sheet 1
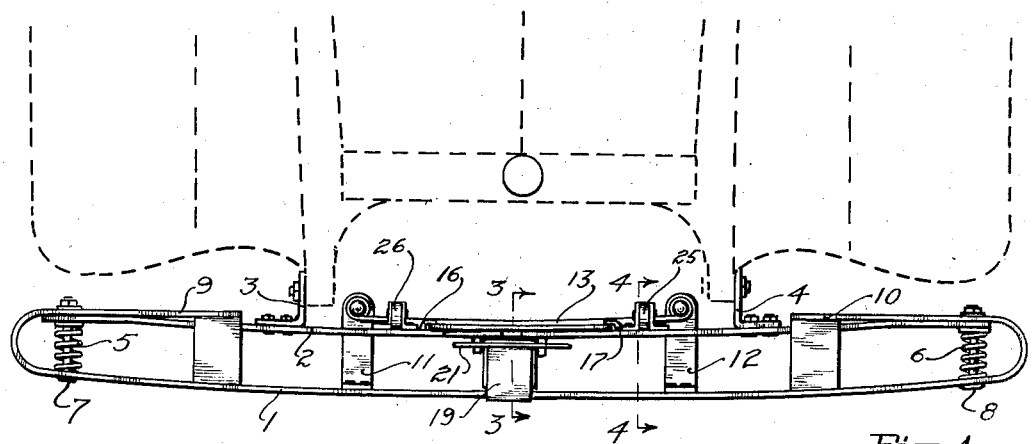
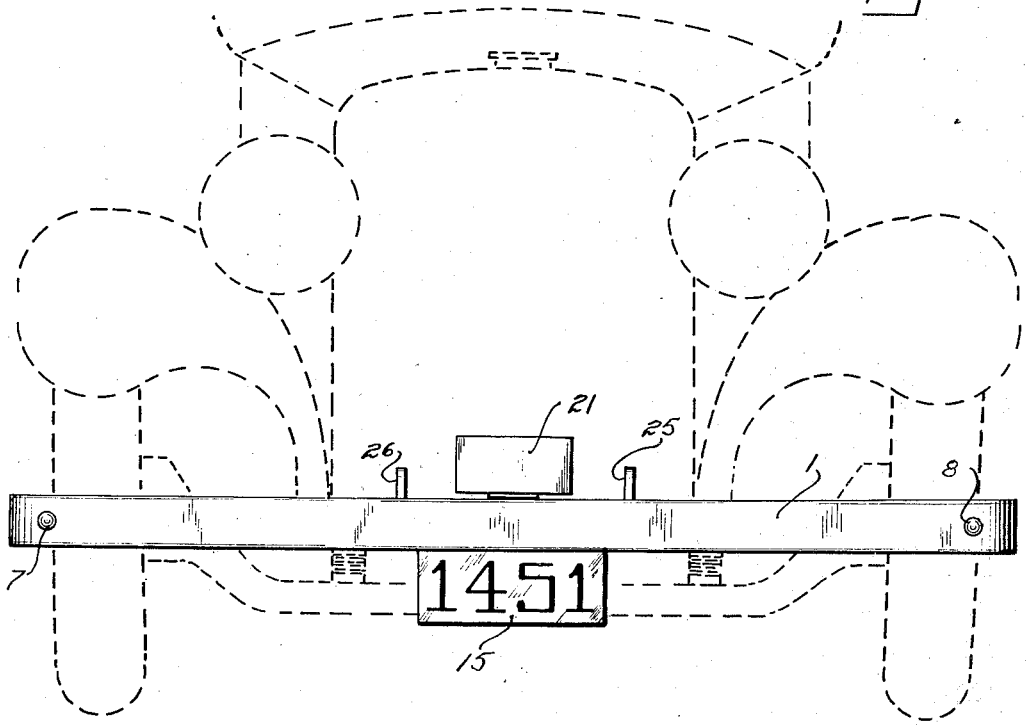
Inventor
Stephen Skoko
By Thomas Bilyeu
Attorney April 25, 1933.  S. SKOKO  1,905,007
COMBINATION AUTOMOBILE LICENSE CARRIER, BUMPER, AND RELEASE
Filed Dec. 7, 1932   2 Sheets-Sheet 2
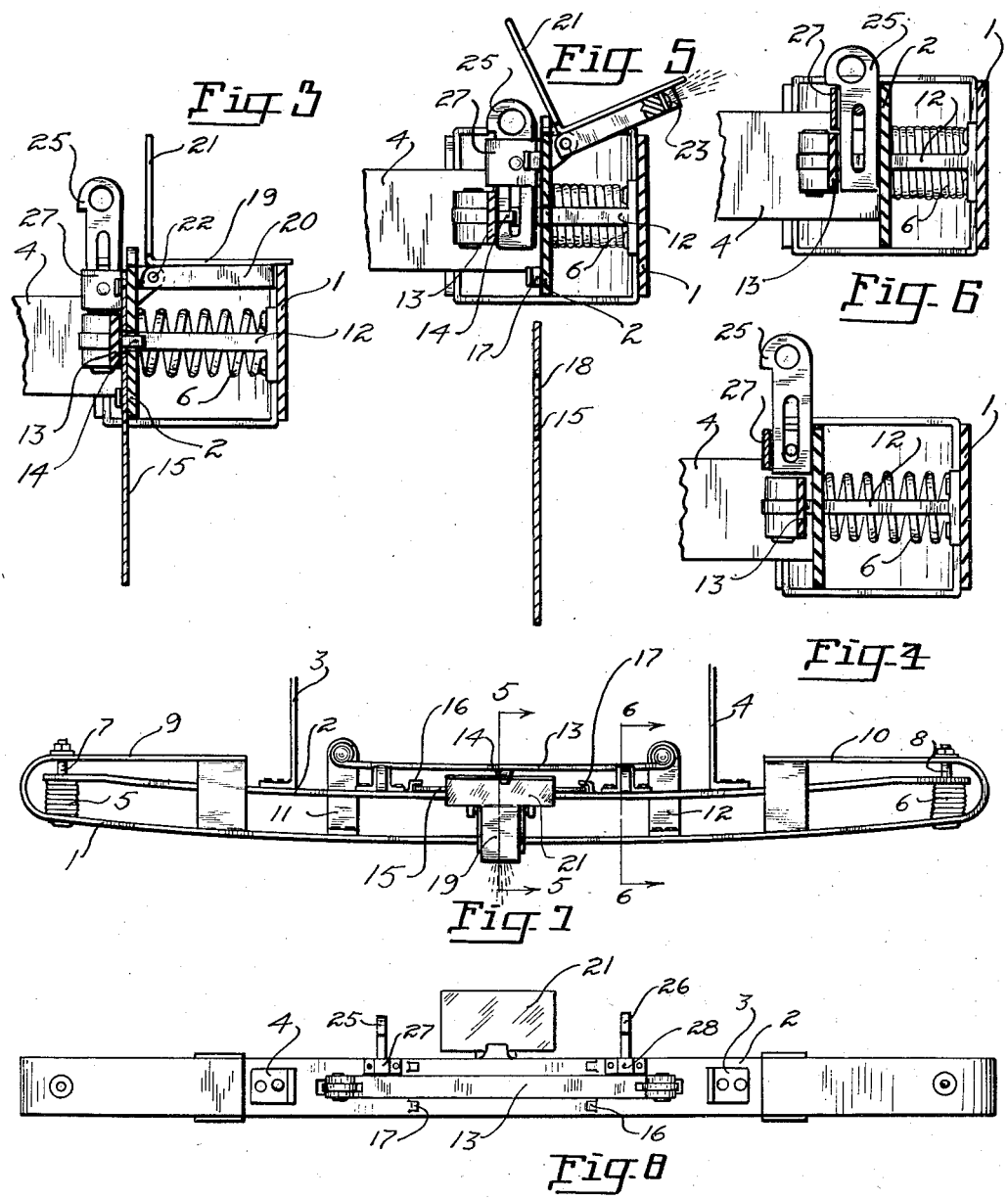
Inventor
Stephen Skoko
Attorney Patented Apr. 25, 1933

1,905,007

UNITED STATES PATENT OFFICE

STEPHEN SKOKO, OF PORTLAND, OREGON

COMBINATION AUTOMOBILE LICENSE CARRIER, BUMPER, AND RELEASE

Application filed December 7, 1932. Serial No. 646,134.

My invention relates to a carrier for automobile license plates so arranged that the license plate will be automatically released from the carrier should the automobile bumper with which the license plate is associated be forcibly actuated. The invention is composed primarily of a pair of spring bumper members normally spaced apart through the inherent action of springs composing the bumper and compressible elements disposed therebetween. A license plate carrier, associated with the posterior member of the automobile bumper, automatically releases the license plate or other identifying means when the automobile bumper is forcibly actuated. A governing device is associated with the bumper and with the license plate support assembly, which prevents the releasing of the license plate should the bumper be actuated while the vehicle, upon which the same is mounted, is stationary.

The primary object of my invention is to provide a support for the license plate of a motor vehicle that may be automatically released when the bumper is actuated or rearwardly compressed, providing automatic means for preventing the "hit-and-run" driver's escaping from the scene of an accident without leaving an identification in the form of his license plate.

A further object of my invention consists in providing a governor in connection with the license plate support and bumper assembly that will prevent the releasing of the license plate from its support when the bumper is compressed during the period when the motor vehicle is stationary.

With these and incidental objects in view, the invention consists in certain novel features of construction and combination of parts, the essential elements of which are set forth in the appended claims, and a preferred embodiment of which is hereinafter shown with reference to the drawings which accompany and form a part of this specification.

In the drawings:

Fig. 1 is a top plan view of the assembled device.

Fig. 2 is a front view of the assembled device illustrating the license plate or identification plate in normal position in relation to the automobile bumper. In Figs. 1 and 2 the bumper and license plate support assembly is shown attached to an automobile, the automobile being shown in dotted outline.

Fig. 3 is a sectional end view of the assembled device. This view is taken on line 3—3 of Fig. 1, looking in the direction indicated.

Fig. 4 is a sectional end view of the assembled device. This view is taken on line 4—4 of Fig. 1, looking in the direction indicated.

Fig. 5 is a sectional end view of the assembled device taken on line 5—5 of Fig. 7, looking in the direction indicated.

Fig. 6 is a sectional end view of the assembled device taken on line 6—6 of Fig. 7, looking in the direction indicated.

Fig. 7 is a top plan view of the assembled device. In this view the bumper assembly is shown as having been compressed, and the support for the license plate as having been actuated sufficiently to permit the release of the license plate.

Fig. 8 is a rear view of the assembly.

Like reference characters refer to like parts throughout the several views.

The automobile bumper is composed of a front member 1 and a rear member 2. The rear member has a pair of brackets 3 and 4 secured thereto whereby the bumper may be attached to the frame of the motor vehicle in the usual manner. The front and rear bumper members are normally spaced apart through the inherent spring action of the material from which the bumpers are made and through the action of the compressible members as coil springs 5 and 6. The coil springs 5 and 6 are disposed upon bolts 7 and 8. The bolts pass through the front bumper and through the outer end of the rear bumper member 2. The front bumper member has reverse bends formed upon itself at its outer ends to permit the terminals 9 and 10 of the front bumper to lap upon the rear surfaces of the rear bumper member 2. Brackets 11 and 12 are secured to the rear surfaces of the front bumper member 1, and extend rearwardly therefrom. A cross bar 13 is secured to the rear ends of the brackets 11 and 12 and interconnects the same. A locking lug 14 is secured to the front side of the cross bar 13 and when the bumper assembly is in its normal position, the front and rear bumper members 1 and 2 are spaced apart to the maximum for intimate contact of the rear bumper member 2 with the cross bar 13. When so positioned, the locking lug 14 passes through the license plate 15, and supports the same. The license plate is held, within suitable guideways 16 and 17, by the respective ends thereof, and a slot 18 is disposed within the license plate through which the locking lug 14 passes. A locking latch 19 is formed of an angle shaped member having a counterbalanced base 20 and an upturned wind engaging shield 21. The angle member is rockably disposed about a journal pin 22. A reflecting light 23 is placed within the front wall of the base 20. The rear and front bumper members are normally spaced apart through the action of reacting elements 5 and 6 and through the inherent spring action of the bumper members themselves. This permits the locking latch to drop down into the position as illustrated in Fig. 3. In the event that the bumpers are struck while the locking latch is in the position as illustrated in Fig. 3, the license plate cannot be released and disengaged from the bumper assembly. During the forward movement of the vehicle the wind resistance actuates the locking latch and angle bar causing them to assume the position illustrated in Fig. 5. When so raised the bumper members may be actuated forcibly to disengage the locking lug 14 from the license plate 15 to thereby release the same. A pair of locking pawls 25 and 26 are carried within suitable brackets 27 and 28, and the same normally rest upon the top of the cross bar 13. When the bumper assembly is compressed into the position as illustrated in Fig. 6, the locking pawls will drop down between the rear surface of the rear bumper member 2 and the front face of the cross bar 13 to thereby maintain the same in compressed position to facilitate the release of the license plate 15. When in this position, as illustrated in Fig. 5 and in Fig. 6, the locking latch 19 is prevented from resuming its position between the bumper members, and it remains in the position shown in Fig. 5 until the locking pawls 25 and 26 have been released from between the rear bumper member and the cross bar.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of front and rear members spaced apart by compressible elements disposed at the oppositely disposed ends of the front and rear members, means for removably securing the rear member to the frame of an automobile, a cross bar disposed at the rear and secured to and in spaced relationship with the rear bumper member, a locking lug disposed upon the cross bar and forwardly extending therefrom, guide brackets secured to the rear member and in which a license plate is normally held and supported upon the forwardly extending lug of the cross bar, rockable means for normally maintaining the front and rear members spaced apart, said means being adapted for being actuated by wind pressure, and means for locking the front and rear members together when the front member is repressed.

2. In a device of the class described, the combination of resilient front and rear members disposed in juxtaposition with each other and normally spaced apart by compressible elements, means for removably securing the rear member to the frame of a motor vehicle, a cross bar disposed in juxtaposition to the rear resilient member and normally spaced at the rear of the rear resilient member, a locking lug secured to and forwardly extending from the cross bar, guides for maintaining the license plate, said license plate being adapted for being normally supported upon the lug and within the guides when the spaced front and rear resilient members are in normal spaced relationship, means for normally maintaining the front and rear members spaced apart, said means being counter-balanced and rocked out of locking position by wind pressure, and means for locking the front and rear resilient members together when the front member is repressed and for releasing the license plate from the supporting lug when the front member is repressed.

3. In a device of the class described, the combination of an automobile bumper comprised of resilient front and rear members, means for normally maintaining the front and rear members normally spaced apart, a supporting lug carried by the rear resilient bumper member, a license plate disposed upon the lug and within supporting guide ways, rockable counter-balanced means carried by one of the bumper members and adapted for normally maintaining the bumper members spaced apart, said rockable means being actuated out of locking position by wind pressure, means for locking the front member in repressed position, and means for releasing the license plate from the supporting lug when the front bumper member is rearwardly repressed.

4. In a device of the class described, the combination of an automobile bumper, comprised of primary and secondary resilient members that are normally spaced apart by compressible means, means for securing the bumper assembly to an automobile frame, a license plate support indirectly secured to one of the primary bumper members, a license plate supported upon the supporting means, a rockable counter-weighted spacing means carried by one of the bumper members that is adapted for normally maintaining the primary and secondary bumper members spaced apart, said rockable means being adapted for being actuated by air pressure, means for locking the front of the primary bumper members relative to the rear bumper member when the front bumper member is repressed, and means for releasing the license plate from its supporting means when the front bumper member is forced rearwardly.

5. In a device of the class described, the combination of an automobile bumper that is comprised of two resilient members, rockable counter-weighted spacer means carried by one of the bumper members, said spacer means being adapted for being rocked out of spacing position by air pressure caused by the forward movement of the motor vehicle to thereby release the spacer means from position to maintain the bumper members spaced apart thereby, a license plate locked in supported position when the bumper members are in normal spaced position, and means for releasing the license plate from the bumper support when the rockable spacer is actuated out of normal spacing position and the bumper members are forced together.

STEPHEN SKOKO.